United States Patent [19]

Kuwahara et al.

[11] Patent Number: 5,349,447
[45] Date of Patent: Sep. 20, 1994

[54] FACSIMILE MACHINE

[75] Inventors: Tetsuya Kuwahara, Shiga; Eiichi Morimoto, Moriyama, both of Japan

[73] Assignee: Murata Kikai Kabushiki Kaisha, Kyoto, Japan

[21] Appl. No.: 22,732

[22] Filed: Feb. 24, 1993

[30] Foreign Application Priority Data

Mar. 3, 1992 [JP] Japan .................................. 4-045655
Mar. 3, 1992 [JP] Japan .................................. 4-045656

[51] Int. Cl.$^5$ ............................................. H04N 1/00
[52] U.S. Cl. .................................. 358/404; 358/400; 358/444
[58] Field of Search ............... 358/400, 401, 403, 404, 358/407, 434, 435, 436, 437, 438, 439, 440, 442, 441; 379/95

[56] References Cited

U.S. PATENT DOCUMENTS

| | | | |
|---|---|---|---|
| 4,290,084 | 9/1981 | Minshull et al. | 358/451 |
| 4,887,162 | 12/1989 | Arai | 358/400 |
| 5,087,979 | 2/1992 | Schaertel | 358/444 |
| 5,105,284 | 4/1992 | Sakata et al. | 358/444 |
| 5,216,517 | 6/1993 | Kinoshita et al. | 358/400 |

FOREIGN PATENT DOCUMENTS 60-236565A 11/1985 Japan .................... H04N 1/21

Primary Examiner—Edward L. Coles, Sr.
Assistant Examiner—Jerome Grant, II
Attorney, Agent, or Firm—Spensley Horn Jubas & Lubitz

[57] ABSTRACT

The facsimile machine comprises a memory for storing data, a device for comparing identification information of a calling station carried on data transmitted from the calling station with identification information registered beforehand as identification information of communication-permitted stations, and a controller not for printing the received data and not for storing the received data in the memory while performing communication procedure, if the identification information of the calling station does not correspond to the registered identification information. A timer is provided for setting a time zone during which the controller functions. The communication is carried out at the fastest rate if the identification information of the calling station does not correspond to the registered identification information. The controller sends a "transmission succeeded" signal to a sending party even if an error occurs during the data reception.

7 Claims, 8 Drawing Sheets

FACSIMILE MACHINE

BACKGROUND OF THE INVENTION

1. Technical Field

The present invention relates to a facsimile machine.

2. Background Art

Sometimes, unnecessary information such as direct mails is delivered via a facsimile machine. During the reception of such information, the facsimile machine is used for a wasteful job and a recording paper is wasted. In addition, since the line becomes busy during the data reception, another third party should wait until the end of the reception.

In view of the above, a certain kind of facsimile machine detects a TSI (Transmitting Subscriber Identification), which is carried on the data transmitted from a sending party, and checks whether the TSI is a registered one. TSIs of data sending parties are registered beforehand in the facsimile, and if the TSI corresponds to one of the registered TSIs, the data reception (or line connection) is permitted. Otherwise, the data is judged to be sent from an unwanted stranger and the data transmission is refused or interrupted (or the line is disconnected).

Generally, a facsimile machine prints a facsimile number of a sending party in an upper area of a recording sheet in addition to information transmitted from the sending party (e.g., image data). Therefore, the registration of TSIs may be made using the facsimile numbers of the sending parties.

When the unnecessary direct mail is transmitted and The transmission is interrupted, the sending party probably thinks that the facsimile machine of receiving party malfunctions. Then, the sending party resends the direct mail. As a result, the receiving party repeatedly receives wasteful information.

In addition, if the information is worth but the sending party is not registered yet, the data transmission is automatically interrupted so that the important information never reaches the receiving party. In short, the conventional facsimile machine sometimes refuses the data from important parties. This drawback may be overcome by providing a switch which allows an operator to cancel the data interruption (or line disconnection). In order to use this switch, however, the operator should know what information is being sent before pressing the switch.

Further, the facsimile number printed on the top of recording sheet is not enough to identify the sending party since the printed facsimile number is a number input by the sending party. In other words, the sending party can input a fraudulent number and the receiving party cannot check whether the facsimile number is true or not. Moreover, the sending party can hide the facsimile number and no facsimile number will be printed on the recording sheet at the receiving side. In this case, the receiving party does not have any information to distinguish the transmitting party and cannot refuse the data transmission. In addition, the -Facsimile number contained in the TS1 is not always identical to the registered facsimile number. For example, if the former is 123456 and the latter is 12 3456 or 12-3456, the facsimile machine of receiving side cannot make a proper judge.

In summary, the facsimile machine which has a function of printing the facsimile number of transmitting side on the recording sheet is not satisfactory.

SUMMARY OF THE INVENTION

A first object of the present invention is to provide a facsimile machine which can avoid a situation where the transmitting party repeatedly sends unnecessary information.

A second object of the present invention is to provide a facsimile machine which can refuse or interrupt the line connection if transmitted data is really unnecessary.

A third object of the present invention is to provide a facsimile machine which can inform an operator of what information is being transmitted from unknown party to effectively use recording sheets.

A facsimile apparatus according to the first aspect of the present invention in view of the first object comprises a memory for storing data, means for comparing identification information of a calling station carried on data sent From the calling station to the facsimile machine with identification information registered beforehand as identification information of communication-permitted stations, and control means not for printing the received data and not for storing the received data in the memory while performing communication procedure, if the identification information of the calling station does not correspond to the registered identification information.

With this facsimile machine, if the non-permitted station sends the data, the data reception procedure is carried out, but the data is not printed and stored in the memory. This operation is referred to as "camouflage reception" in this particular specification. Therefore, the recording sheet and the memory are not used for unnecessary information. Further, since the data reception is not interrupted but maintained until the end of the data reception, the calling station believes that the data is successfully transmitted. Accordingly, the calling station does not resend the same information. Since the received data is not printed and stored in the memory, no problem arises even if any types of error occurs. Thus, the called station keeps sending a positive response to the calling station during the data reception (or while the line is connected). The maximum communication rate is set to reduce the communication period. Of course, the decoding of the data is not necessary.

The first object is also achieved by a facsimile machine comprising means for comparing identification information of a calling station carried on data sent to the facsimile machine with identification information registered beforehand as identification information of communication-not-permitted stations, and control means for refusing the communication (or the line connection) or for performing camouflage data reception, the identification information of the calling station corresponds to the registered identification information.

If the identification information of the calling station corresponds to one of the identification information of not-permitted stations which are registered beforehand, the line connection is interrupted or the camouflage reception is performed. This operation is applied to only unwanted stations.

According to the second aspect of the present invention in view of the second object, there is provided a facsimile comprising memory means for temporarily storing a TSI signal carried with image data transmitted from a calling station during a facsimile data communication, means for registering the TSI signal if it is judged that the image data is not worth, and means for setting the facsimile communication invalid if the arrival of data having the registered TSI is detected.

With this facsimile machine, the TSI of the calling station is temporarily stored in the memory. The TSI has an FIF (Facsimile Information Field) and various data which is unique to the calling station is held in the FIF. The operator sees the received image data printed on the recording sheet, and if he thinks that he does not want to communicate with this station from next time, he registers the TSI which is temporarily stored in the memory. After that, when the data having the same TSI, which is now registered at the called station, arrives, the data transmission From such a station is disregarded.

In order to achieve the third object, there is provided a facsimile machine comprising a memory for storing data, means for comparing identification information of a calling station carried on data received by the facsimile machine with identification information registered beforehand as identification information of communication-permitted stations, and means for saving a recording sheet or saving the memory, if the identification information of the calling station does not correspond to the registered identification information.

The data-from-non-registered reception is performed if the identification information of the calling station has not been registered at the calling station. In this reception mode, for example, the received data may be reduced when it is printed, the data may be printed only partially or the data may be partially stored in the memory. In either case, the remaining data is deleted. The scale down printing saves the recording sheet. Partial printing also saves the recording sheet. Partial storage saves the memory. The operator can know what data is transmitted from the not-registered station by seeing the printing or a display which shows the content of the memory.

The third object is also achieved by a facsimile machine comprising means for comparing identification information of a calling station carried on data received by the facsimile machine with identification information registered beforehand as identification information of communication-permitted stations, means for storing the received data if the identification information of the calling station does not correspond to the registered identification information, means for indicating the identification information of the calling station, and means For indicating the reception of the data.

If the facsimile number of the calling station corresponds to one of permitted station's facsimile numbers, the received data is printed. Otherwise, the alarm is activated and the facsimile number of the calling station is displayed. The operator sees the display and determines whether the printing is necessary.

These and other aspects, objects and advantages of the present invention will become more apparent from the Following detailed description as read with the accompanying drawings and appended claims.

DESCRIPTION OF THE PREFERRED EMBODIMENTS

Now, preferred embodiments of the present invention will be described with reference to the accompanying drawings. Same or similar elements are assigned same or similar numerals in different drawings.

First, a first embodiment will be explained with FIGS. 1 and 2.

Figure 1:
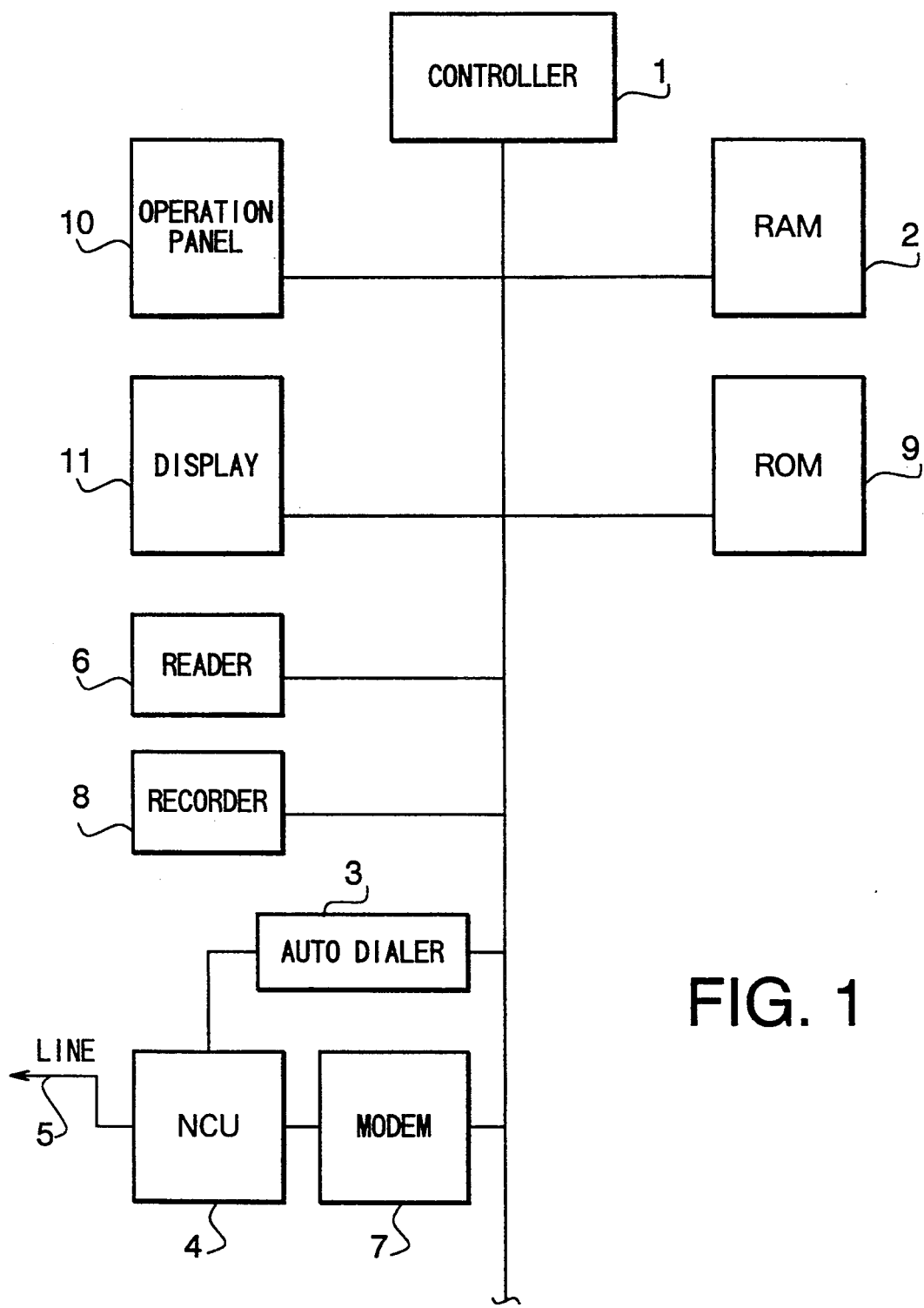
FIG. 1 is a schematic block diagram of a facsimile machine according to one embodiment of the present invention.

A facsimile machine (G3 type) of FIG. 1 includes a controller 1 which performs an overall control of the facsimile machine and supervises a switching between normal data reception and camouflage data reception (or line disconnection or data-from-unknown-party reception) in accordance with a TSI of transmitting party, a RAM 2 which stores incoming and outgoing data, telephone and facsimile numbers and information used for the transmitting party identification, an autodialer 3 for automatically dialing a facsimile number, an NCU (Network Control Unit) 4 for controlling a data transmission line 5, a reader 6 for optically reading a document placed on a document mount or tray, a modem 7 for the data modulation and demodulation, a recorder 8 for printing image data using a thermal head and for preparing a journal report concerning the camouflage reception (or data-from-unknown-party reception), a ROM 9 for storing programs necessary to activate the controller 1, an operation panel 10 including a ten-key, a speed-dialing (one-touch dialing) key and a function key and a display 11 including, for example, an LCD (Liquid Crystal Display).

ID information for distinguishing desired parties and undesired parties are registered by calling an ID information registration mode and inputting ID numbers. The ID information registration mode may be called by pressing a certain function key and inputting a several-digit number. The ID information may include a subscriber's number, a maker code and a ID number. If a third party is already assigned a one-touch dialing number, such a number may be used as the ID information.

Whether a third party is a desired party or not is decided by an operator using the TSIs. Specifically, the operator manipulates the facsimile machine to store the TSIs of all the transmitted data and print them in the journal report, and when a direct mail is transmitted, the operator will see the journal report to identify the calling party. If the calling party transmits a direct mail, then the operator registers his TSI as unwanted party's number.

Whether the camouflage reception mode is available or not may be determined by operator's pressing a certain key of the operation panel or by a timer. If the timer is used, the turning on and off the timer are set by calling a timer set mode and inputting the start and end time. The timer set mode is called by manipulating a certain function key and the ten key and the start/end time is input with the ten key.

Figure 2:
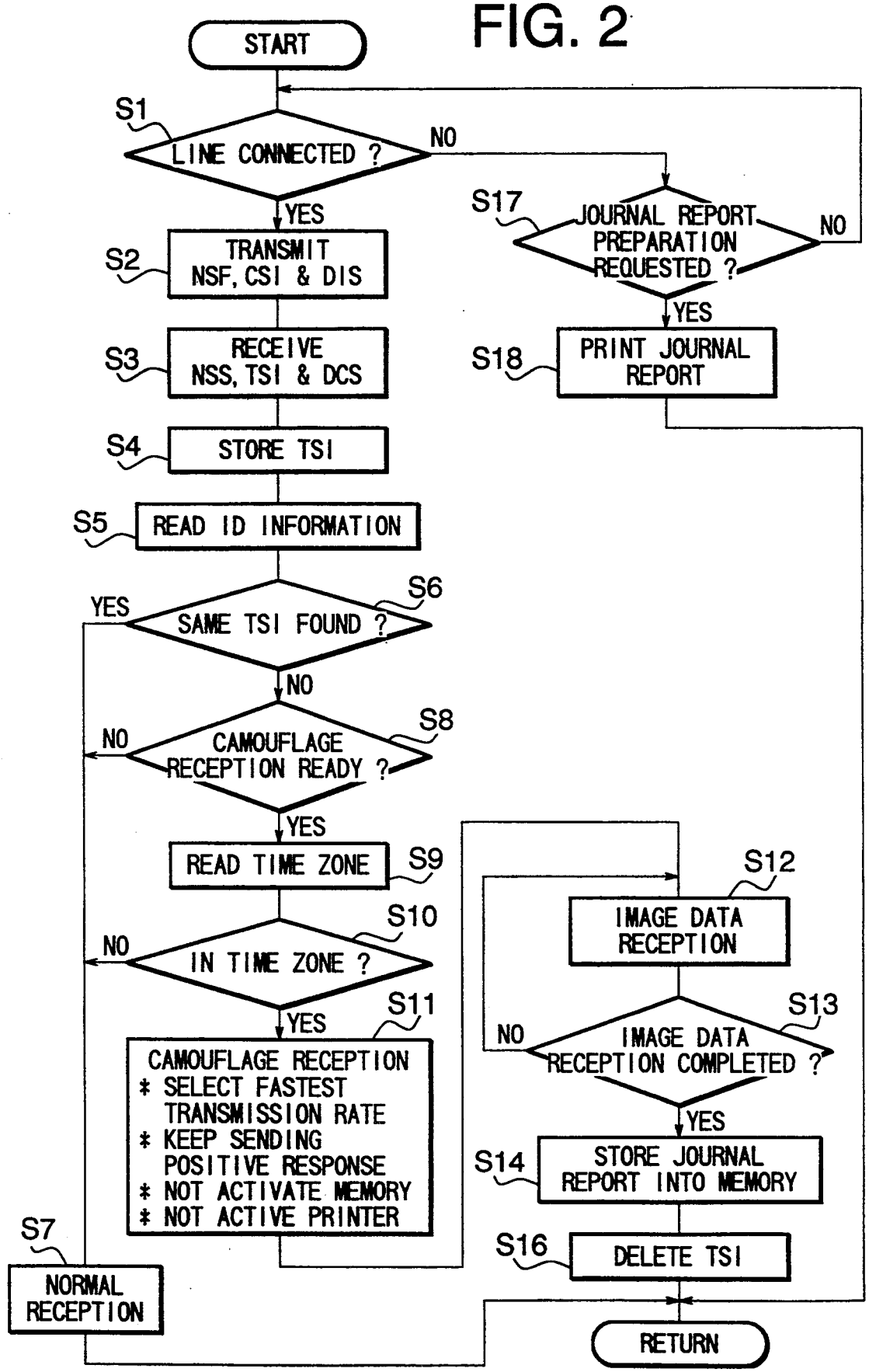
FIG. 2 is a flowchart showing data reception and journal report preparation as well as a printing operation thereof when the facsimile machine of FIG. 1 is used.

Referring now to FIG. 2, illustrated is a process of data reception, journal report preparation concerning the camouflage reception and data printing. First, it is checked whether the line is connected (S1). If the answer is positive, an NSF (Non-Standard Facilities) signal, a CSI (Called Subscriber Identification) signal and a DIS (Digital Identification Signal) signal are sent back to the sending party (S2) while receiving an NSS (Non-Standard Set-up) signal, a TSI (Transmitting Subscriber Identification) signal and a DCS (Digital Command Signal) signal (S3). Then, the TSI is stored (S4) to judge whether the TSI of the information sent from outside corresponds to one of TSIs registered as "good (wanted)" station ID numbers (S5 and S6). If the answer is yes, a normal reception starts (S7). If the answer is no, it is checked whether the camouflage reception mode is ready to be turned on (S8). If it is not yet ready, the program proceeds to step 7. If the facsimile machine is ready for the camouflage reception mode, data of time zone is read from the ROM 9 (S9) to check whether the present time is in a time zone for the camouflage reception ("effective time zone") (S10). If the present time is not in the effective time zone, the program advances to step 7. On the other hand, if the present time is in the effective time zone or no time zone is set, the camouflage reception mode is turned on (S11). If the camouflage reception mode is turned on, the fastest and ideal transmission rate is chosen, a "data transmission possible" signal is sent to the sending party even if the selected fastest transmission rate may or actually causes an error, a "data transmission succeeded" signal is sent to the sending party even if the data transmission actually fails and a "not write" signal is sent to a WR (write) terminal of the RAM 2 so that no write address is output from the RAM. In addition, the data is not supplied to the recording unit 8, the thermal head is not activated and the recording sheet feeding motor is not activated during the camouflage reception mode while receiving the data from the sending party (S12). Therefore, the data is not stored into the RAM 2 and the printer 8 does not print anything. Then, it is checked whether the data reception is completed (S18). If the answer is yes, various data such as TSI of the sending party and data reception date and time, which will be printed on a camouflage reception journal, is stored in the RAM 2 (S14), and the TSI stored at step 4 is deleted (S16). Then, the program proceeds to "RETURN".

On the other hand, if the answer at step 1 is no, it is checked whether the report preparation is requested (S17). If the answer is yes, the journal report is printed which includes not only the TSI, data reception (or line connection) date and time, data reception period and number of received pages, but a sentence indicating that the received data is disregarded (S18). As mentioned earlier, the TSI, data reception date and time, data reception period and number of received pages are stored at step 4.

The above described facsimile machine does not print and store the transmitted data while performing the data reception procedure when the data is transmitted from a stranger. Therefore, the recording sheet is not wasted and the memory is not used for storing unnecessary information. Further, since communication procedure is completed without interruption, the sending party believes that the data transmission has succeeded. Accordingly, the receiving party does not receive the same unnecessary information repeatedly.

In addition, since the journal report regarding the camouflage reception is made, the receiving party can know from whom and when the unwanted information is transmitted.

The camouflage reception mode functions only when the present time is in the preset "effective" time zone. The effective time zone may be during the night since generally the direct mails are sent at night, and the camouflage reception mode may not available during the day time. This can be determined by the operator.

Since the received data is not printed and stored in the RAM 2, i.e., it is disregarded, there is no problem even if any type of error occurs during the data reception. Accordingly, even if an error is found during the data reception, a positive response is given to the sending party. Also, the fastest data transmission rate is chosen to minimize the communication period.

The Foregoing explanation deals with a G3 facsimile machine. IF the G4 Facsimile machine is used, a similar camouflage reception is carried out using ID information contained in a set-up message.

Figure 3:
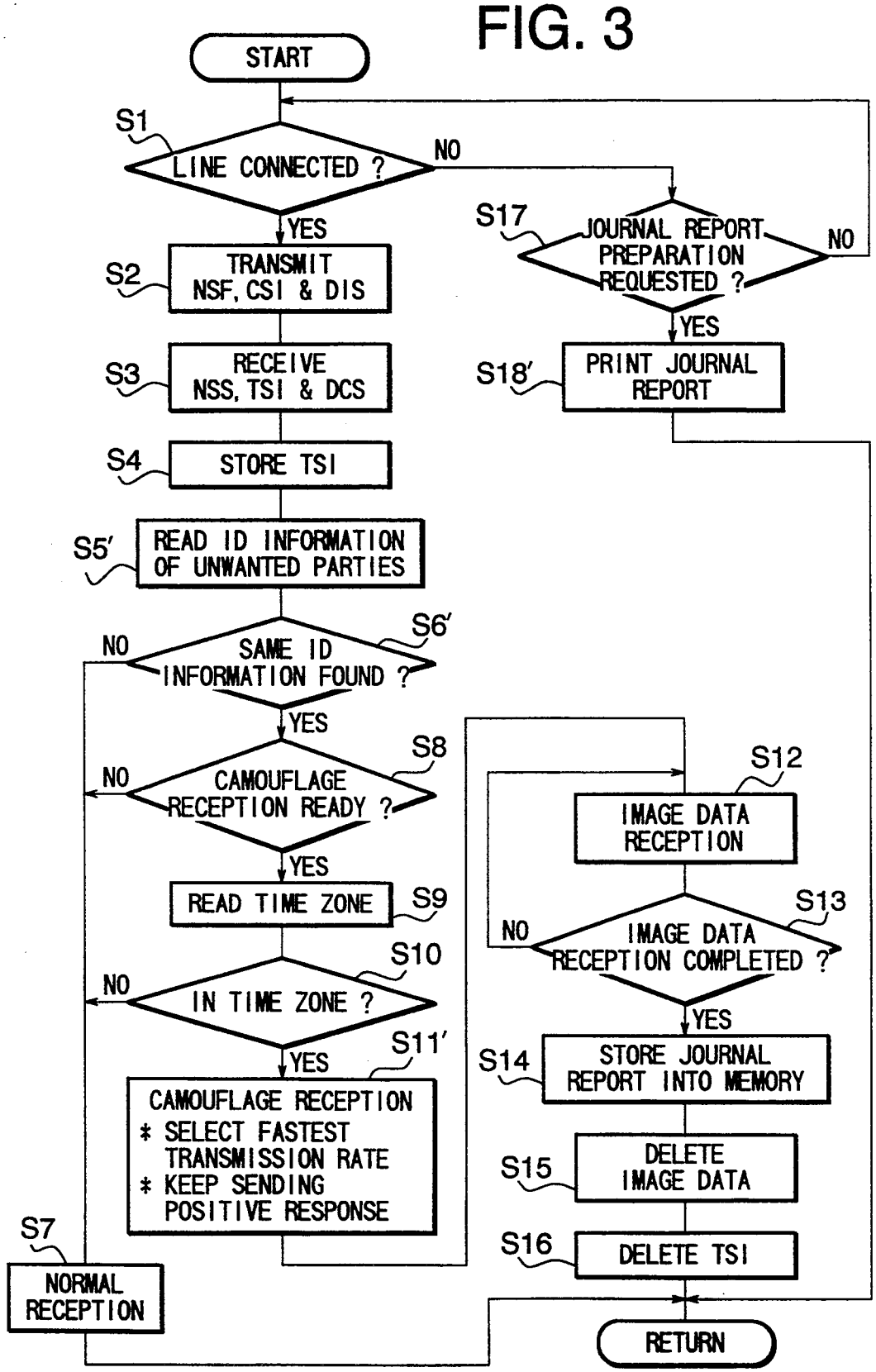
FIG. 3 is a flowchart showing another type of data reception and journal report preparation as well as a printing operation thereof when the facsimile machine of FIG. 1 is used.
Figure 8:
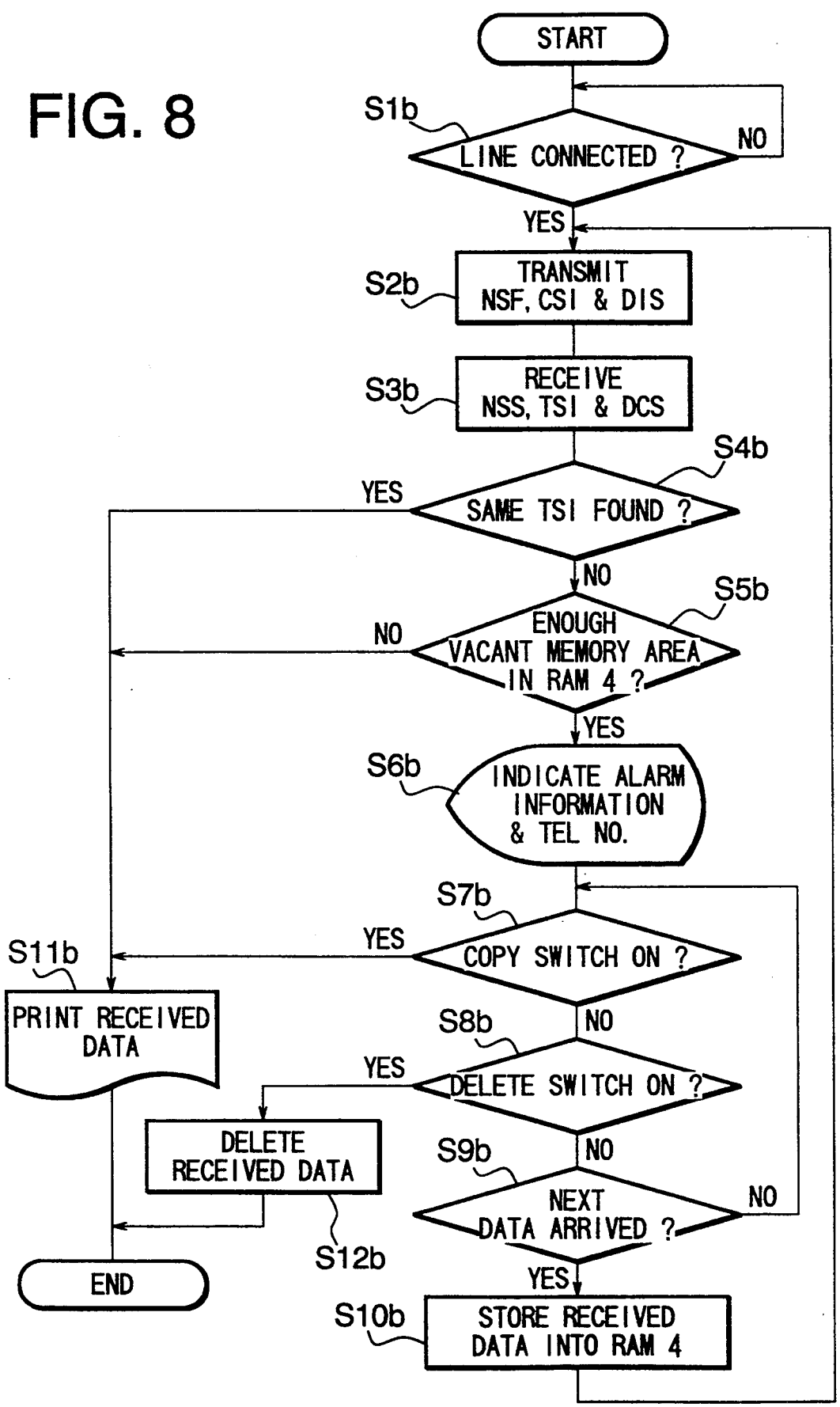
FIG. 8 is a flowchart showing data reception and journal report preparation of the facsimile machine of FIG. 7.

FIG. 3 shows a flowchart of camouflage reception when the ID information of unwanted parties are already registered. The process of S1–S4 of FIG. 8 is the same as that of FIG. 1. Thus, the explanation of S1–S8 will be omitted.

After S4, it is checked whether the TSI of the transmitting party corresponds to one of the registered ID information (S5' and S6'). If the TSI does not correspond to any ID information, normal data reception procedure starts (S? ). On the other hand, if the TSI corresponds to a certain ID information, then it is checked whether the camouflage reception mode is ready to be turned on (S8). If the camouflage reception mode is not ready to be turned on, the program advances to step 7. On the other hand, if the camouflage reception mode is ready, the time zone data is read from the ROM (S9) to check whether the present time is in the effective time zone (S10). If the present time is not in the effective time zone, the program proceeds to step 7. On the other hand, if the present time is in the effective time zone or no time zone has been set, the camouflage reception mode is turned on (S11'). If the camouflage reception mode is turned on, the fastest and ideal transmission rate is set, a "data transmission possible" signal is transmitted to the transmitting party even If the selected fastest transmission rate may or actually causes an error, a "data transmission succeeded" signal is sent to the sending party even if the data transmission actually fails while receiving the data from the transmitting party in the RAM 2 (S12). Then, it is checked whether the data reception is completed (S13). If the answer is yes, various data such as TSI of the transmitting party and data reception (or line connection) date and time, which will be printed on a camouflage reception journal, is stored in the RAM 2 (S14), the data received by the memory is deleted (S15) and the TSI stored at step 4 is deleted (S16). Then, the program proceeds to "RETURN".

On the other hand, if the answer at step 1 is no, it is checked whether a report preparation is requested (S17). If it is requested, the journal report is printed which includes the kind of reception (e.g., normal reception, receiving person specified reception, camouflage reception or reception refusal) in addition to the TSI and data reception date and time stored at S4 (S18').

The above described facsimile machine performs the camouflage reception only when the ID information carried on the data sent from the sending party corresponds to one of registered unwanted party's numbers. Therefore, the line connection is refused to the unwanted party only.

In the foregoing embodiment, the data transmitted from the unwanted third party is temporarily stored in the RAM 2 and deleted eventually without printing. However, the data from the unwanted party may not be stored in the RAM 2 even temporarily or part of the data may be printed and/or stored if the operator desires so.

Since the communication procedure is completed without interruption, the sending party believes that the data transmission has succeeded and does not resend the useless information.

A second embodiment of the present invention now will be described with FIGS. 4 and 5.

Figure 4:
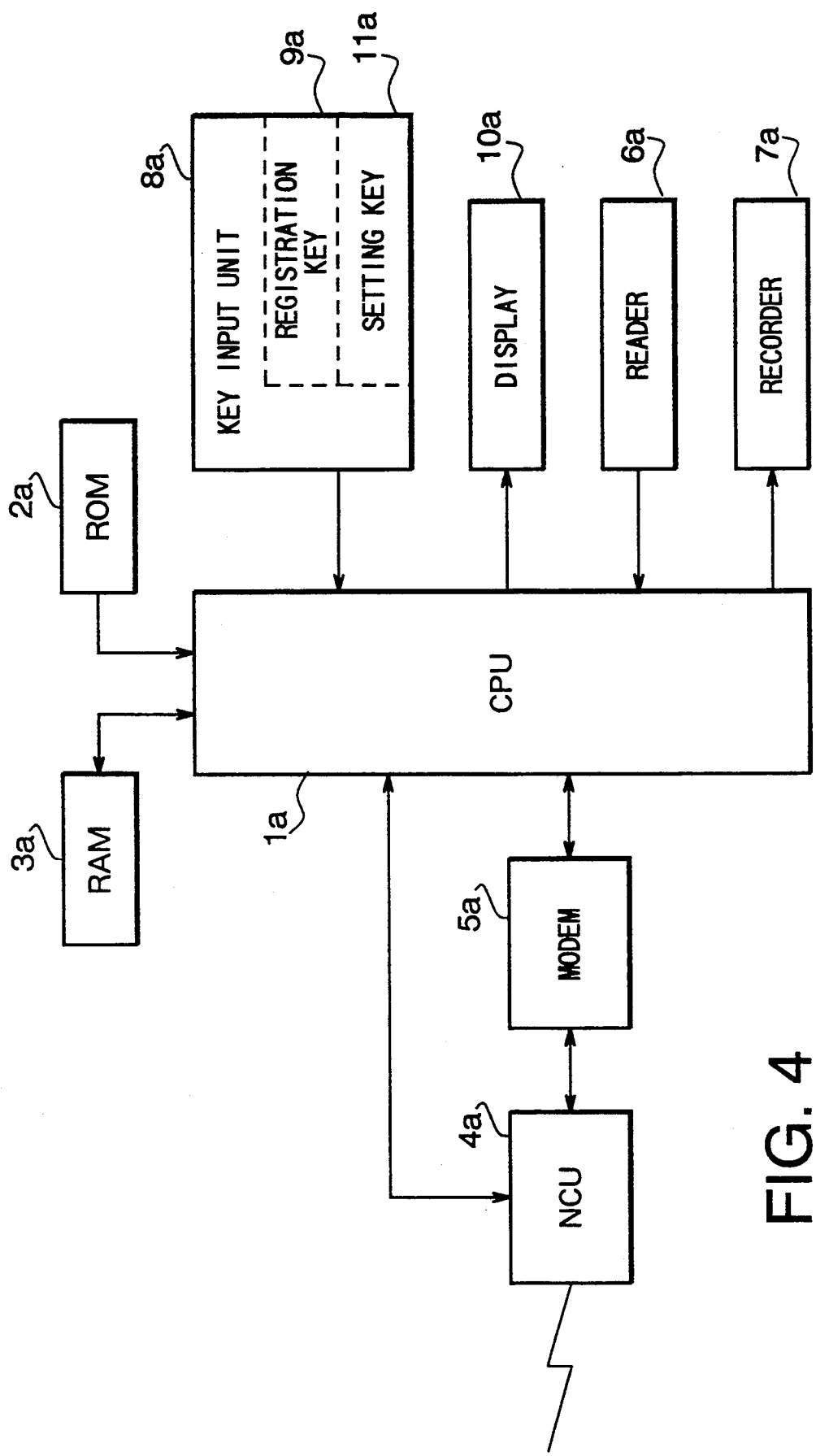
FIG. 4 is a schematic block diagram of a facsimile machine according to a second embodiment of the present invention.
Figure 5:
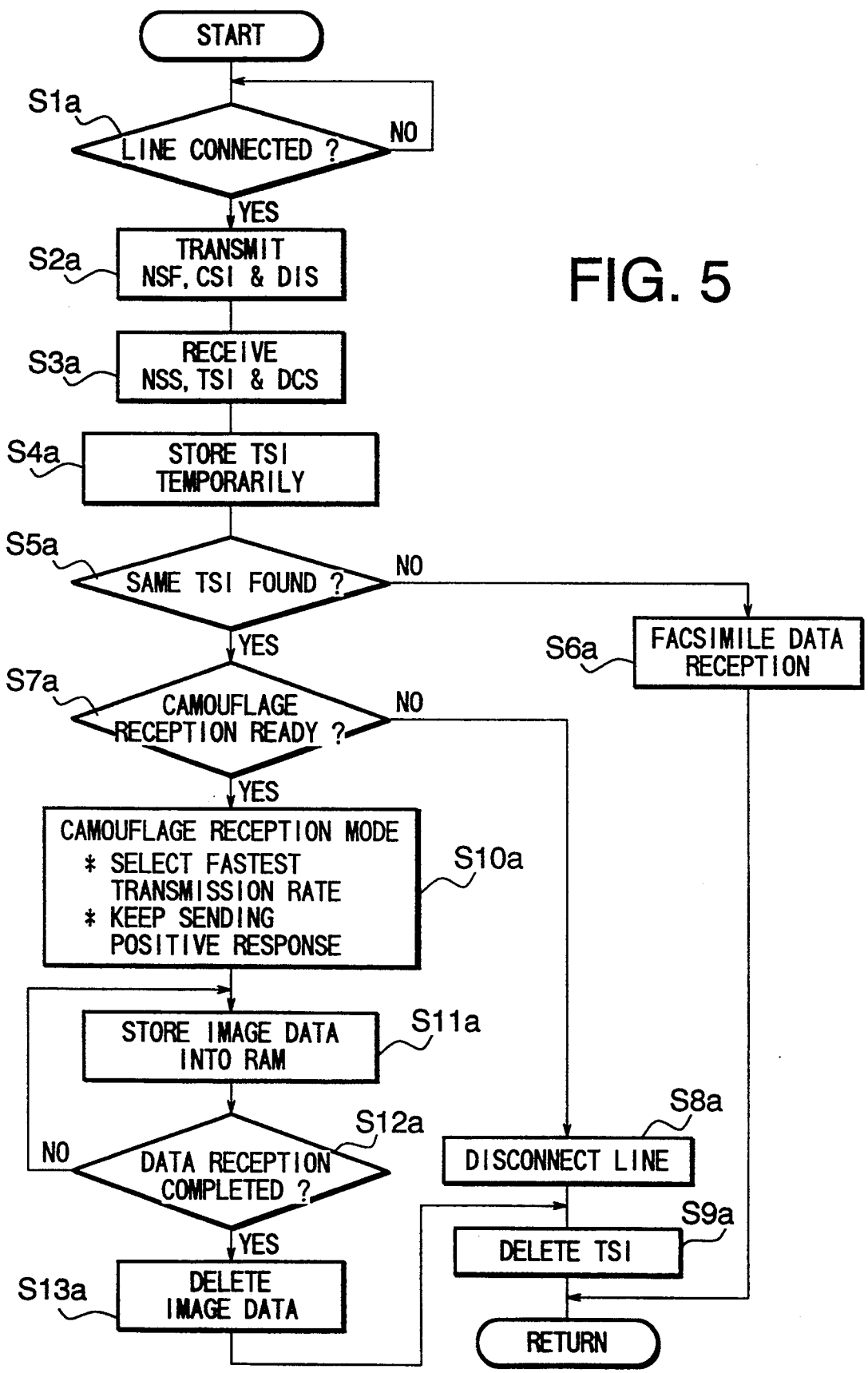
FIG. 5 is a flowchart showing data reception when the facsimile machine of FIG. 4 is used.

Referring to FIG. 4, a CPU la controls an overall operation of a facsimile machine on a program stored in a ROM 2a. A RAM 3a which serves as memory means temporarily stores various information such as image data to be transmitted and received and a TSI signal transmitted from a sending party.

An NCU 4a controls the connection with a telephone line. A modem 5a performs the modulation and demodulation of data to be transmitted and received. A reader 6a reads image data appearing on a manuscript. A recorder 7a prints data on a recording sheet based on the received image data. A key input unit 8a includes a dial key (not shown) for inputting, for example, a facsimile number, a registration key 9a for registering TSI signal data which is temporarily stored in the RAM 3a, and a setting key 11a for the setting and cancellation of camouflage reception mode. A display 10a is provided for displaying various information.

The TSI contains an FIF (Facsimile Information Field) and ID data unique to a facsimile machine such as a facsimile number is held in the FIF. The ID data contained in the TSI signal cannot be input by the transmitting party. Therefore, the ID data of the TSI can be reliably used for the receiving party to identify the transmitting party. The TSI signal is inevitably transmitted to the transmitting party during the data transmission.

In this embodiment, the registration means includes the CPU 1a, RAM 3a and the registration key 9a. Thus, the TSI signal is temporarily stored in the RAM 3a during the data reception, and when the data reception is completed and the registration key 9a is manipulated, the CPU 1a registers the TSI in the RAM 3a.

If the CPU 1a detects the arrival of data which carries the registered TSI, the facsimile communication with the sending party is made "ineffective" Being "ineffective" means the interruption of data reception and/or the disconnection of the line with the sending party or the data being received in the camouflage reception mode. In the camouflage reception, the line connection is not interrupted and the image data from the transmitting party is temporarily stored in the RAM 3a and deleted after the completion of the data reception. The operator can set and reset the camouflage reception mode by manipulating the setting key 11a of the key input unit 8a.

Next, the operation of the facsimile machine of FIG. 3 will be explained with a flowchart of FIG. 5. The facsimile machine performs the operation shown in FIG. 5 under control of the CPU 1a during the data reception.

When image data transmitted from a sending party is detected by the facsimile machine on the receiving side, an NSF (Non-Standard Facilities) signal, a CSI (Called Subscriber Identification) signal and a DIS (Digital Identification Signal) signal are sent back to the transmitting party From the receiving side (S1a, S2a). Then, an NSS signal, the TSI signal and a DCS signal are transmitted from the transmitting party (S3a)

After that, the TSI signal is temporarily stored in the RAM 3a and it is checked whether the stored TSI corresponds to one of TSIs registered beforehand in the RAM 3a (S4a, S5a). If the stored TSI does not correspond to any one of the registered TSIs, it is judged that the sending party is a "good (permitted)" party so that normal facsimile data reception starts. Specifically, the recorder 7a is activated and the image data sent from the transmitting party is printed on the recording sheet (S6a). In the above procedure, the image data may be first stored in the RAM 3a and drawn from the RAM 3a for the printing after the completion of the data reception.

On the other hand, if the TSI signal carried with the image data from the transmitting party corresponds to one of the registered TSIs, it is judged that the line connection should be refused, and it is then checked whether the camouflage reception mode is available (S5a, S7a). If the camouflage reception mode is not available, the data reception is interrupted and the line with the transmitting party is disconnected. After that, the TSI signal which is temporarily stored in the RAM 3a is erased (S8a, S9a) since this signal is already registered.

If the camouflage reception mode is set at step 7a, the camouflage reception starts. In the camouflage reception mode, the maximum transmission rate is chosen and a "data transmission possible" signal is transmitted to the sending party even if the selected fastest transmission rate may or actually causes an error. Even if an error really occurs, the facsimile machine keeps transmitting a positive answer (S10a). Simultaneously, the facsimile machine performs the image data reception. The image data is temporarily stored in the RAM 3a. When the data reception is completed and the line is disconnected, the image data in the RAM 3a is deleted (S11a–S13a). Then, the program proceeds to S9a.

After the normal data reception (S6a) is completed, on the other hand, the operator sees the image data printed on the recording sheet. If the operator thinks that he does not want to have information from this particular transmitting party, he manipulates the registration key 9a, before the next information is sent, to register the TSI of the sending party which is temporarily stored in the RAM 3a. Therefore, from the next time, when the information is sent from the same party, the facsimile machine will refuse the data reception by disconnecting the line or by using the camouflage reception mode, and no printing is performed.

On the other hand, if the operator thinks that the information is worth, he does not touch the registration key 9a until the next information arrives. When the next data reaches the facsimile machine, the TSI which is temporarily stored in the RAM 3a is automatically deleted. The operator may manually delete the TSI from the RAM 3a immediately after he judges the information worth.

As described above, when the facsimile machine of this embodiment is used, the operator manipulates the registration key 9a to register the TSI signal of the transmitting party in the RAM 3a if the unnecessary image data is transmitted from the sending party. Since the TSI signal includes an ID data unique to the facsimile machine of the transmitting side and cannot be input by the operator of the transmitting side, the operator of the receiving side can reliably use the TSI in determining whether the transmitting party is an unexpected party or not. Once the TSI signal is registered, the same TSI is always sent from the same party as long as the same facsimile machine is used on the transmitting g side. Therefore, if the TSI signal of the unwanted party is once registered, the line connection with such a party is always refused. Accordingly, the recording sheet will not be wasted.

If the camouflage reception mode is not available, the communication (line connection) with the transmitting party is immediately interrupted. Therefore, the facsimile machine is not used for the useless communication for a long period, and it can soon get ready for another communication.

When the camouflage reception mode is selected, the fastest transmission rate is chosen for the communication. Therefore, the communication period is minimized and such communication hardly becomes an obstacle to urgent data transmission from another party. In the camouflage reception mode, the image data stored in the RAM 3a is deleted without being printed. Accordingly, even if any errors occurred during the communication, no problem would arise. During the camouflage reception, a positive response is always produced and the fastest transmission rate is maintained.

If the camouflage reception mode is set, the communication procedure is not interrupted until the end of the data transmission. This makes the transmitting party believe the safe data transmission. As a result, the transmitting party does not resend the information.

The present invention is not limited to the foregoing embodiment and various changes and modifications may be made:

(1) When the camouflage reception is performed or the line connection with the sending party is interrupted, information relating to the camouflage reception or the interrupted communication such as the ID data in the TSI signal and data reception date and time may be stored in the RAM 3a. This information may be printed on the journal report when required by the operator of the receiving side facsimile machine. With the journal report, the operator can know when and from whom unnecessary information is transmitted; and (2) The camouflage reception mode may be used in a preset time zone. For instance, since generally most of the direct mails arrive during the night, the camouflage reception may be set ready only in the night.

Next, a third embodiment of the present invention will be explained with FIGS. 1 and 6.

ID information is registered by an operator. Specifically, the operator manipulates the function key and the ten key to call an ID information registration mode and input ID information such as a subscriber number, a maker code and an ID number. If a facsimile number of a party is registered as a speed dialing number (or one touch dialing number), such an abbreviated number may be used as the ID information.

The data-from-non-registered-party reception mode is see by the operator manually or automatically by means of timer. If the reception mode should be automatically turned on by the timer, the operator inputs the time zone (i.e., starting and ending time) during which the data-from-non-registered-party reception is performed, using the function key and the ten key.

There are three variations in the data-from-non-registered-party reception performed by the controller 1:

(i) To print the image data in smaller dimension;

(ii) To print part of the image data, e.g., to print first page only; and (iii) To store part of the image data in a memory and disregard the remainder.

Manufactures of the facsimile machine may decide which variation the facsimile machine should perform or the operator may select it. In (i), the thinning out operation may be carried out to reduce the size of the image data. In (ii), after the partial printing of the image data, the data reception may be continued but the thermal head and the recoding sheet feeder may be turned off. A scale down printing may be carried out in this case. In (iii), the image data stored in the memory may be printed or displayed on a monitor. (iii) may be performed by sending a "not write" command to the printer after storing part of the image data or storing all the image data in the memory first and deleting part of it afterward.

Figure 6:
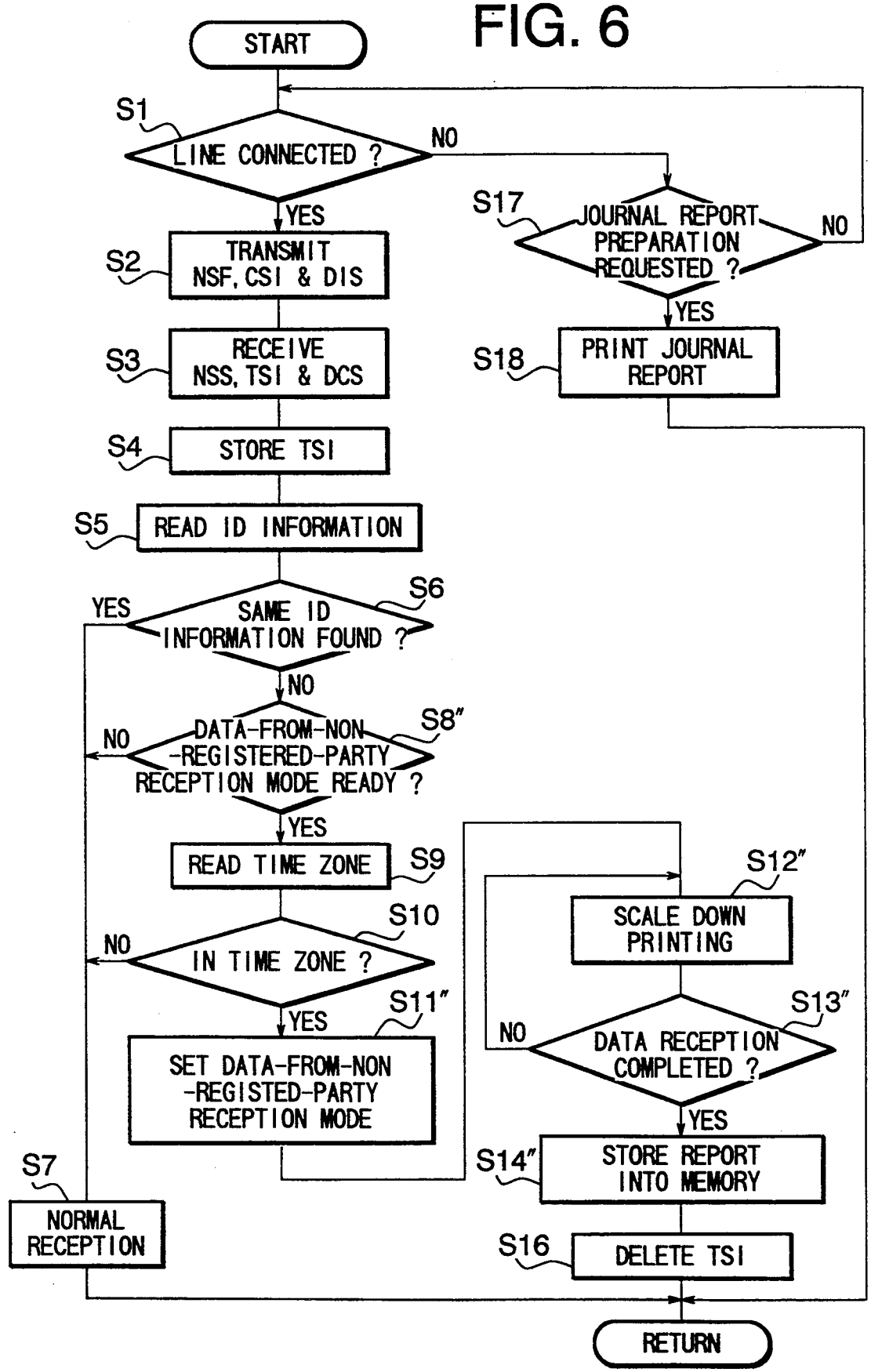
FIG. 6 is a flowchart showing data reception and journal report preparation as well as a printing operation thereof when data is transmitted from unknown party according a third embodiment of the present invention.

FIG. 6 illustrates a flowchart showing the data reception, the journal report preparation concerning the data-from-non-registered-party reception mode and the printing operation therefor. In this embodiment, the scale down printing is carried out.

The operation from S1 through S6 is the same as that of FIG. 2 so that the explanation thereof will be omitted.

At S6, if the TSI of the received data corresponds to one of TSIs registered as "good" parties in the RAM, the facsimile machine performs the normal data reception procedure (S7). Otherwise, it is checked whether the data-from-non-registered-party reception mode is ready (S8''''). If this mode is not ready, the program advances to step 7. If it is ready, the time zone data is read from the ROM (S9) to check whether the present time is in the preset time zone (S10). If the answer is negative, the program proceeds to step 7. On the other hand, if the answer is positive or no time zone is set beforehand, the data-from-non-registered-party reception mode is activated (S11'''') and the scale down printing is carried out (S12). Then, it is checked whether the image data reception is completed (S13''''). If the answer is yes, various information which will be printed on a journal report regarding the data-from-non-registered-party reception such the TSI of the sending party and data reception date and time is stored in the RAM 3a (S14''''). After that, the TSI stored at step 4 is deleted (S16) and the program proceeds to "RETURN".

If the line is not connected as step 1, it is checked whether the Journal report preparation is requested (S17). if it is requested, the information stored at step 14 such as the TSI of the sending party and the data reception date and time as well as the received data, whose size is reduced in the scale down processing, is printed on the journal report of data-from-non-registered-party reception. The printing may be carried out only for part of the information. This information may be stored in the memory (S18).

With this facsimile machine, unless the transmitting party is registered as a permitted party, the received image data is printed in the reduced size or only part of the image data is printed or stored in the memory with the remainder being disregarded. If the image data is stored in the memory, the operator can see the stored image data in the display. Since the scale down printing is performed, the recording sheet is saved. Also, since only part of the image data is stored in the memory, the vacant memory area is saved. Since entire or part of the received image data is printed or displayed, the operator can see what data is transmitted. This mode therefore can be called a saving mode.

If only part of the image data is printed, the line connection with the transmitting party may be disconnected by the operator. In such a case, however, the transmitting party may think that the data transmission does not succeed and resend the same image data. To avoid this, it is preferred that the line connection should be maintained until the end of the data transmission.

Since the journal report concerning the data-from-non-registered-party is prepared, the operator can know when and who sent the unnecessary information.

The data-from-non-registered-party reception of this embodiment may be made ready only in the night, for example, since unnecessary direct mails are generally sent at night. In this case, the data-from-non-registered-party reception mode may be ready during the day time. This is determined by the time zone set by the operator.

Next, a fourth embodiment of the present invention will be explained with FIGS. 7 and 8.

Figure 7:
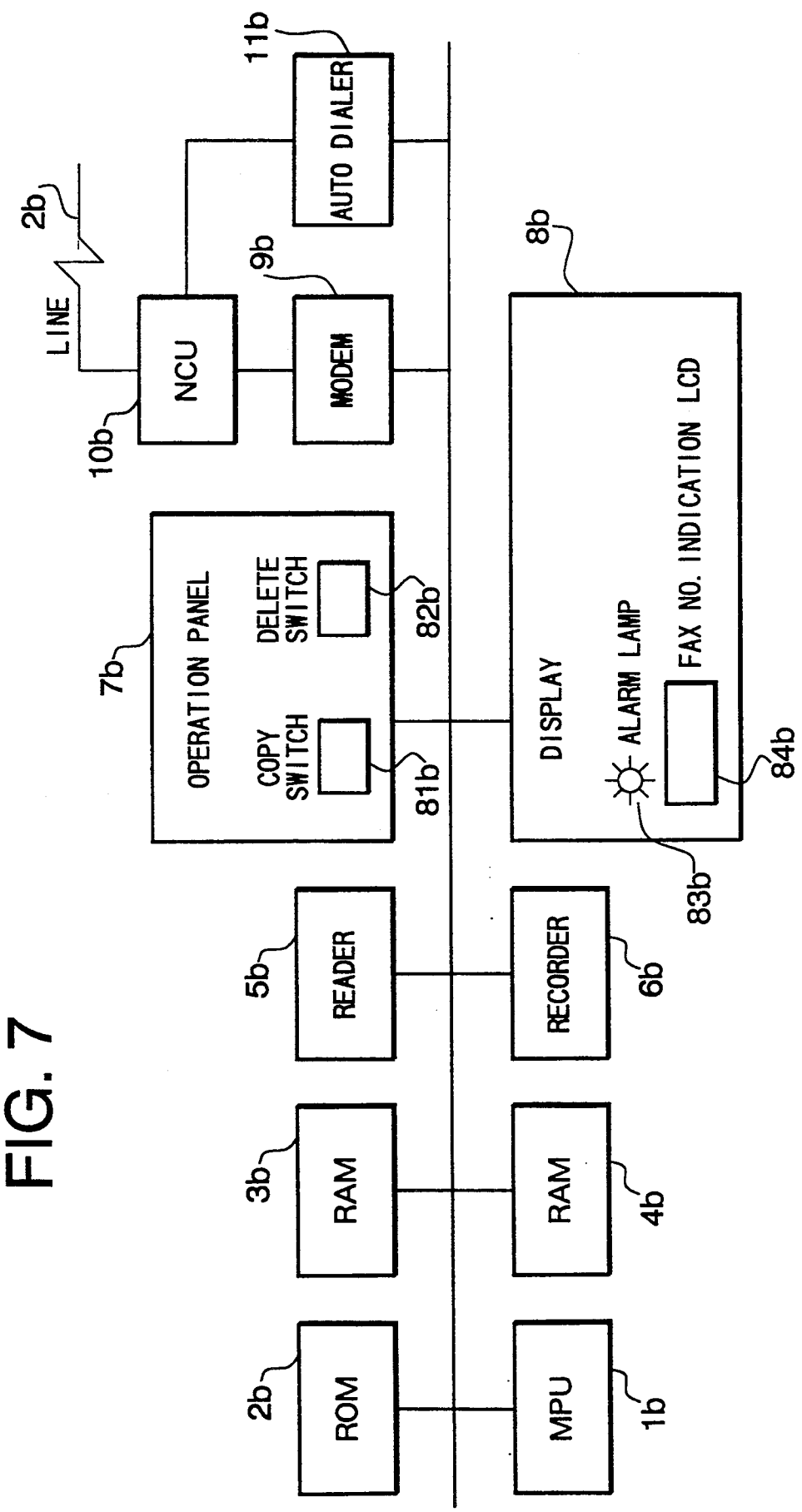
FIG. 7 is a schematic block diagram of a facsimile machine according to a fourth embodiment of the present invention.

FIG. 7 shows a block diagram of a facsimile machine of this embodiment.

The facsimile machine includes an MPU (Micro Processing Unit) 1b, a ROM 2b, a RAM 3b, another RAM 4b, a reader 5b, a recorder 6b, an operation panel 7b, a copy switch 81b, a delete switch 82b, a display 8b, a modem 9b, an NCU 10b, an auto-dialer 11b and a line 12b. The MPU 1b reads contents of the ROM 2b, which stores a program for the data reception, to control the facsimile machine. The first RAM 3b stores facsimile numbers (full numbers or reduced numbers) of "good" parties. The second RAM 4b stores data delivered through the line 12b. The reader 5b optically reads the content of document set on a manuscript tray. The recorder 6b exposes the heat of dot-unit on a recording sheet by a thermal head to record the received data. The operation panel 7b includes a copy switch 81b to input a received data print command and a delete switch 82b to input a received data delete command. The display 8b includes a flasher lamp 83 for the alarm and a liquid crystal display (LCD) 84 for indicating a facsimile number of the sending party. The modem 9b modulates and demodulates the data. The NCU 10b controls the line 12b. The auto-dialer 11b is used for the automatic dialing.

Referring now to FIG. 8, the data reception procedure of this embodiment will be explained with the flowchart. The data reception procedure follows the program stored in the ROM 2b.

When a calling tone from a sending party transmitted through the line 12b is automatically detected, the NCU 10b generates a called subscriber identification signal and a group identification signal to secure the line (S1b).

Then, the facsimile machine of the called side transmits an NSF (Non-Standard Facilities) signal for identifying that the request from a third party is outside Recommendations of the T series, a CSI (Called Subscriber Identification) signal for indicating the identification in the form of international telephone number and a DIS (Digital Identification Signal) signal for indicating that the called party's facsimile machine has a data receiving function of CCITT standard. In other words, all the functions of the facsimile machine of the called side such as a facsimile group number and various data transmission functions are informed to the calling side (S2b).

If the calling station is a data sending terminal, a certain function is selected among the functions shown in the DIS signal. Then, the selected function is informed to the called station with a DCS (Digital Command Signal) signal so as to fix the data transmission from the calling station and the data reception by the called station. Simultaneously, an NSS (Non-Standard Set-up) signal for indicating that a certain function is selected among the non-standard functions and a TSI (Transmitting Subscriber Identification) signal for indicating the transmitting station in the form of international telephone number are transmitted to the called station (S3b).

The TSI signal, which contains a facsimile number of the calling station, is received by the called station and stored into the MPU 1b through the NCU 10b and the modem 1b. Then, it is compared with facsimile numbers registered beforehand in the first RAM 3b (S4b). If the received TSI (facsimile number) corresponds to one of the facsimile numbers registered in the first RAM 3b, the received data is printed (S11b). Otherwise, an amount of data currently stored in the second RAM 4b is checked (S5b). If the amount of data currently stored in the RAM 4b is approximately equal to a volume (or capacity) of the RAM 4b, the received data is immediately printed by the recorder 6b since there is no room for the just received data in the RAM 4b. On the other hand, if there is found a vacant area in the RAM 4b for new coming data at step 5b, the alarm lamp of the display unit 8 flashes to indicate that any facsimile numbers do not correspond to the received TSI and the data from the unwanted station is stored. At the same time, the facsimile number of the calling station is displayed in the LCD 84a (S6b).

If the copy switch 81b on the operation panel 7b is turned on (S7b), the received data is printed by the recorder 8b (S11b). On the other hand, if the copy switch 81b is turned off at step 7b, then it is checked whether the delete switch 82b on the operation panel 7b is turned on or off (S8b). If the switch 82b is turned on, the received data is deleted (S12b), whereas if the switch 82b is turned off, it is checked whether next data arrives (S9b). If no data has come, the program returns to step 7b and waits for the turning on of the copy switch. On the other hand, if new data is detected (S9b), it is temporarily stored in the RAM 4b (S10b). After that, the program returns to step 2b.

We claim:

1. A facsimile machine comprising:
   means for registering identification information of unwanted stations;

means for detecting an identification information carried on in data transmitted from a calling station; and control means for maintaining the facsimile communication while disregarding the transmitted data if the identification information of the calling station corresponds to one of the identification information of unwanted stations or for disconnecting a line with the calling station if the identification information of the calling station corresponds to one of the identification information of unwanted stations; and a timer for setting a time zone, the control means maintaining the line connection while disregarding the transmitted data if the data arrives in the time zone whereas the control means interrupts the line connection if the data does not arrive the time zone.

2. The facsimile machine of claim 1, wherein the identification information is information contained in a facsimile information field (FIF) of a TSI of the data sent from the calling station.

3. The facsimile machine of claim 2, further including a printer for preparing a report which indicates the TSI, date and time of data reception.

4. The facsimile machine of claim 3, wherein the communication is carried out at the fastest rate.

5. The facsimile machine of claim 4, wherein the control means maintains the data reception even if an error occurs during the data reception.

6. The facsimile machine of claim 5, further including a memory for storing the data, and the printer prints part of the data stored in the memory means.

7. The facsimile machine of claim 6, wherein the data stored in the memory means is deleted upon the completion of the data reception.

* * * * *